United States Patent [19]

Lorsch

[11] 4,314,416
[45] Feb. 9, 1982

[54] DIAPOSITIVE FRAMES

[76] Inventor: Johannes Lorsch, An der Bleiche 49, D-4172 Straelen, Fed. Rep. of Germany

[21] Appl. No.: 166,707

[22] Filed: Jul. 7, 1980

[30] Foreign Application Priority Data

Jul. 5, 1979 [DE] Fed. Rep. of Germany ....... 2927109

[51] Int. Cl.³ .............................................. G09F 1/12
[52] U.S. Cl. ................................................... 40/152
[58] Field of Search ............ 40/152, 154, 156, 158 R, 40/158 B

[56] References Cited

U.S. PATENT DOCUMENTS

| 2,165,790 | 7/1939 | Engel | 40/152 |
| 2,268,529 | 12/1941 | Kime | 40/152 |
| 2,603,017 | 7/1952 | Merrill | 40/152 |
| 2,806,308 | 9/1957 | Goldberg | 40/152 |
| 3,419,987 | 1/1969 | Hipp | 40/152 |

FOREIGN PATENT DOCUMENTS

| 224523 | 5/1925 | United Kingdom . |
| 895570 | 5/1962 | United Kingdom . |
| 1223151 | 2/1971 | United Kingdom . |
| 1246672 | 9/1971 | United Kingdom . |

Primary Examiner—Gene Mancene
Assistant Examiner—Wenceslao J. Contreras
Attorney, Agent, or Firm—Lowe, King, Price & Becker

[57] ABSTRACT

A diapositive frame for mounting projection slides and the like comprising two frame halves, each having rectangular picture areas therein, and position indicating indentations along marginal section edges. The two frame halves can be joined to form the diapositive frame in two respectively different positions and as thus joined, the indentations serve to provide information as to horizontal or vertical positions of the diaframe.

9 Claims, 4 Drawing Figures

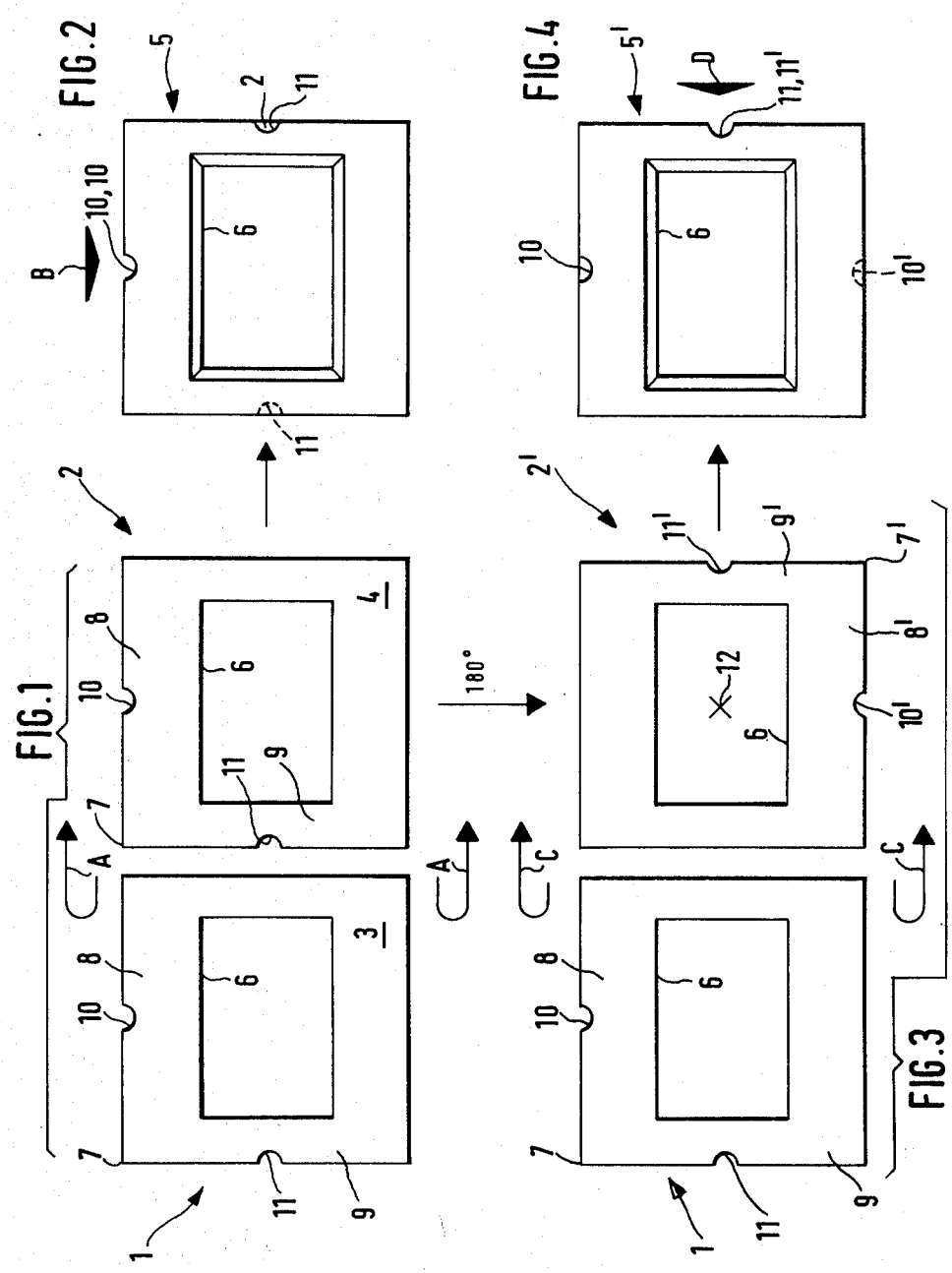

DIAPOSITIVE FRAMES

TECHNICAL FIELD

The invention relates to diapositive frames consisting of two frame halves, each with a rectangular picture area, for mounting rectangular picture slides.

BACKGROUND ART

Diapositive frames of the present general type are used to receive rectangular slides, horizontally as well as vertically. It is known in the art that the two frame halves can be of different colors, one frame half being light and the other one dark. With this arrangement, even with little light from a projector, the front and back sides of the slides can be clearly distinguished from each other.

In addition to a differentiation between the front and back sides, there is the necessity of indicating the correct position of the diapositive frame. In previously known diapositive glass covers, the glass covers were connected on three sides by use of black adhesive tape, and on the fourth side, which marked the upper side, by means of white adhesive tape. Such diapositive glass covers have been largely replaced by diapositive frame that are pre-fabricated, and preferably made of plastic. In such diapositive frames, the side of the slide that must be on top for the correct reproduction of the picture in the slide projector has been marked either by means of adhesive labels, or by means of lines made by a felt tip pen or similar instrument. However, this type of marking is difficult to recognize in a darkened room by light from the projector.

Separate diapositive frames for receiving horizontal and vertical slides have also been manufactured and a marking of the upper edge is provided. This requires separate manufacturing equipment for vertical and horizontal slide frames, separate packing and separate storage. Since the photographer using the frames decides whether to take horizontal or vertical pictures, it is difficult to predict how many slides of a film require separate horizontal or vertical diapositive frames. Separately developed vertical and horizontal diapositive frames therefore present no advantages.

In order to eliminate these disadvantages, the present invention teaches a diapositive frame which makes it possible for the person conducting the framing to easily mark the horizontal and vertical slides.

DISCLOSURE OF INVENTION

According to this invention, the marking is accomplished by providing surface indentations in the frame halves that are located in two marginal sides bordering on a common corner. When the frame halves are fitted together, one surface indentation of one frame half is in alignment with one surface indentation of the other frame half, and wherein, after a rotation of one frame half with respect to the other frame half by 180°, around an imaginary axis of rotation located transversely to the frame level, the other surface indentations of each frame half are in alignment with each other.

Since both diapositive frame halves have a rectangular picture area, a suitable connection of the two frame halves on their insides, for example, by a tongue and groove connection, can only occur in two ways, such that the two rectangular picture areas are in alignment with each other. The surface indentations in the diapositive frame halves are arranged in such a way that two surface indentations are, in each case, in alignment with each other. Since the surface indentations are provided crosswise in the marginal sections of the frame halves, surface indentations that are in alignment with each other are staggered by 90° from each other when the diapositive frame halves are rotated 180° with respect to each other. Since the horizontal and vertical diapositive frames must also be inserted so that they are staggered in regard to each other by 90°, this permits a simple marking by, for example, putting the diapositive frames together, when the slides are inserted, so that the surface indentations which are in alignment with each other are, in each case, located on the same side, for example, in the area of the upper marginal section of the diapositive frame.

According to other features of the invention, the surface indentations can be in the form of recesses, and have the same size and shape. The recesses can be easily recognized especially when they are on the outside edges of the diapositive frame halves. In a further form of the invention, the surface indentations are, in each case, located in the center of the marginal sections. This latter is especially advantageous for manufacturing since, in this case of development, the two frame halves may be identical which results in low tool costs, and also requires no separate marking of the frame halves during packing and transport.

According to the invention, it is possible without special marking means to mark horizontal and vertical diapositive frames by the means such that, when the two frame halves are connected, the frame halves are, according to whether they are a horizontal or vertical slide, fitted together in such a way that the aligned surface indentations of several horizontal and vertical diapositive frames, when arranged in a stacked manner, will in each case point to the same side.

This invention is suitable not only for inserting diapositive frames into a slide projector by hand, but also for slide holders. If, for example, 40 to 140 slides contained in one slide holder have fallen out, the feature of the invention can considerably facilitate correct sorting. In addition, it is possible to determine the correct position of vertical and horizontal diapositive frames automatically by means of optical devices, feelers, etc.

BRIEF DESCRIPTION OF DRAWINGS

FIG. 1 shows in plan view the inside sides of two diapositive frame halves that are to be connected with each other.

FIG. 2 shows in plan view an outside of the diapositive frame created by fitting together the two diapositive frame halves according to FIG. 1.

FIG. 3 shows an arrangement according to FIG. 1, but with the right diapositive frame half rotated by 180° with respect to the arrangement of FIG. 1.

FIG. 4 shows an arrangement according to FIG. 2, for the diapositive frame halves that are connected with each other according to FIG. 3.

BEST MODE FOR CARRYING OUT THE INVENTION

Two diapositive frame halves 1 and 2 are identical, but for the purpose of marking the front side and the back side of the future diapositive frame, each has a different color. The frame halves 1 and 2, on their insides 3 and 4, can be connected with each other by means of connecting devices (not shown) which can function in the nature of tongues and grooves. For this purpose, the frame halves 1 and 2, after the insertion of a slide (not shown), are placed and pressed against each other as indicated by the arrows A, so that the tongue and groove connections engage with each other and thus form a complete diapositive frame 5. The frame halves 1 and 2 each have a rectangular picture area 6. In the marginal sections 8 and 9, which border on a common corner, namely, in FIG. 1 on corner 7, surface indentations are provided that are in the form of recesses 10 and 11. When the frame halves 1 and 2 are placed together and connected with each other according to FIG. 1, the recesses 11, as shown by FIG. 2, are located on opposite sides of the diapositive frame 5, while the recesses 10 are in alignment with each other. By means of the two recesses 10 that are in alignment with each other, there is, when the diapositive frame is fitted together, a continuous recess designated B.

The selection may, for example, be made in such a way that the position of the diapositive frame in the projector is correct when the groove formed by the two aligned recesses 10 is, as in FIG. 2, at the upper edge of the picture. According to the picture area, as shown, this would correspond to a horizontal slide.

The two diapositive frame halves 1 and 2' shown in FIG. 3 are identical to the diapositive halves 1 and 2 in FIG. 1, but the frame half 2 is rotated 180° around an imaginary axis 12 located transversely to the frame level as shown. This position is indicated at 2'. The marginal sections are designated 8' and 9', the common corner 7', and the recesses 10' and 11'. When the frame halves 1 and 2' are placed together and connected with each other according to arrow C, the diapositive frame 5' as shown in FIG. 4 is formed. According to FIG. 2, there also will be a rectangular picture area 6, but the difference, compared to FIG. 2, is that now the two recesses 11, 11' are in alignment with each other, as indicated at D, whereas the recesses 10 and 10' are located on the opposite edges. A comparison between FIG. 2 and FIG. 3 shows that the aligned recesses 10, 10' and 11, 11' are shifted with respect to each other by 90°. If this arrangement according to FIG. 4 is rotated 90° counter-clockwise, then in the case of both diapositive frames, the continuous recess is in the upper edge, but the picture areas are placed at a 90° angle to each other, namely according to the requirements for horizontal and vertical slides.

In this disclosure, there is shown and described only the preferred embodiments of the invention, but as aforementioned, it is to be understood that the invention is capable of changes or modifications within the scope of the inventive concept as expressed herein.

I claim:

1. A diapositive frame comprising two substantially identical frame halves, each of said frame halves including a rectangular picture area, each of said frame halves further including two adjacent edge portions having first and second surface indentations in said edge portions, said frame halves capable of fitting together in substantially overlapping position for locating said first surface indentation of one frame half in alignment with said first surface indentation of the other frame half, whereby rotation of one frame half with respect to the other frame half by 180° around an axis transverse to the frame causes substantial alignment of said second surface indentations with each other.

2. A diapositive frame as described in claim 1, wherein said surface indentations are recesses.

3. A diapositive frame as described in claim 1, wherein said surface indentations are of equal size.

4. A diapositive frame as described in claim 2, wherein said surface indentations are of equal size.

5. A diapositive frame as claimed in 1, wherein said surface indentations are the same shape.

6. A diapositive frame as claimed in claim 1, wherein said surface indentations are each located in the center of said adjacent edge portions.

7. A diapositive frame as claimed in claim 1, wherein said surface indentations border on outside edges of said frame halves.

8. A diapositive frame comprising two identical frame halves, a rectangular picture area in each frame half, said frame halves each having two marginal sections adjacent to a common corner, said marginal sections having outside edges, a position indicating indentation on said outside edge of each said marginal section, joining means on said frame halves to connect said frame halves together in two engaging positions respectively of said frame halves to form said diapositive frame, said diapositive frame in one engaged position of said halves having a first indentation on one half positioned in overlapping alignment with a first indentation on the other frame half and a second of said indentations on one frame half being out of alignment with a second indentation on the other of said frame halves, said diapositive frame in a second engaged position of said halves having said second indentations in alignment and said first indentations being out of alignment.

9. A diapositive frame as described in claim 8, wherein in said second of said frame half engaging positions, one said frame half is rotated 180° about an axis transverse to said frame with respect to the other said frame prior to engagement to reposition the respective said indentations in said second said engaged position.

* * * * *